US011805500B2

(12) United States Patent
Raghavan et al.

(10) Patent No.: US 11,805,500 B2
(45) Date of Patent: Oct. 31, 2023

(54) BEAM AND PANEL SPECIFIC SLOT FORMAT INDICATION CONFIGURATIONS TO REDUCE CROSS-LINK INTERFERENCE

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/193,980

(22) Filed: Mar. 5, 2021

(65) Prior Publication Data

US 2021/0307008 A1    Sep. 30, 2021

Related U.S. Application Data

(60) Provisional application No. 63/000,896, filed on Mar. 27, 2020.

(51) Int. Cl.
*H04W 4/00* (2018.01)
*H04W 72/0446* (2023.01)
*H04W 72/23* (2023.01)
*H04W 72/51* (2023.01)
*H04W 72/541* (2023.01)

(52) U.S. Cl.
CPC ....... *H04W 72/0446* (2013.01); *H04W 72/23* (2023.01); *H04W 72/51* (2023.01); *H04W 72/541* (2023.01)

(58) Field of Classification Search
None
See application file for complete search history.

(56) References Cited

U.S. PATENT DOCUMENTS

| | | | |
|---|---|---|---|
| 2019/0191322 A1* | 6/2019 | Sun | H04W 24/08 |
| 2019/0313476 A1* | 10/2019 | Sun | H04W 76/30 |
| 2020/0029238 A1* | 1/2020 | Si | H04W 56/001 |
| 2020/0267764 A1* | 8/2020 | Rastegardoost | H04W 72/0446 |
| 2020/0305183 A1* | 9/2020 | Papasakellariou | H04W 52/243 |

* cited by examiner

*Primary Examiner* — Zewdu A Beyen
(74) *Attorney, Agent, or Firm* — Harrity & Harrity, LLP

(57) ABSTRACT

Various aspects of the present disclosure generally relate to wireless communication. In some aspects, a base station may determine a first slot format indication (SFI) for a first user equipment (UE) and a second SFI for a second UE based at least in part on a first report that includes first beam metrics for a first set of beams and indications of associated antenna modules or panels of the first UE, and a second report that includes beam metrics for a second set of beams and indications of associated antenna modules or panels of the second UE, and transmit an indication of the first SFI for the first UE and an indication of the second SFI for the second UE. Numerous other aspects are provided.

13 Claims, 5 Drawing Sheets

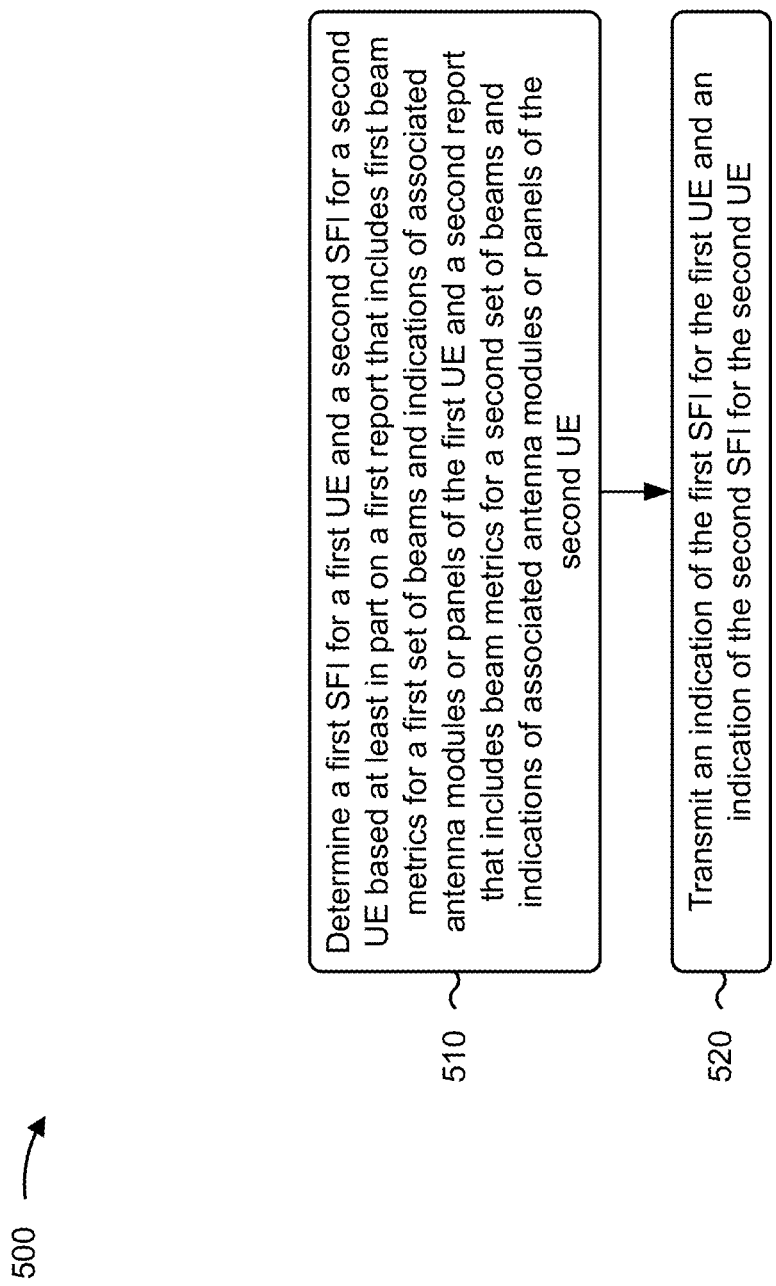

BEAM AND PANEL SPECIFIC SLOT FORMAT INDICATION CONFIGURATIONS TO REDUCE CROSS-LINK INTERFERENCE

CROSS-REFERENCE TO RELATED APPLICATION

This Patent application claims priority to U.S. Provisional Patent Application No. 63/000,896, filed on Mar. 27, 2020, entitled "BEAM AND PANEL SPECIFIC SLOT FORMAT INDICATION CONFIGURATIONS TO REDUCE CROSS-LINK INTERFERENCE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for determining beam and panel specific slot format indication configurations to reduce cross-link interference.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a base station, may include determining a first slot format indication (SFI) for a first UE and a second SFI for a second UE based at least in part on a first report that includes first beam metrics for a first set of beams and indications of associated antenna modules or panels of the first UE, and a second report that includes beam metrics for a second set of beams and indications of associated antenna modules or panels of the second UE; and transmitting an indication of the first SFI for the first UE and an indication of the second SFI for the second UE.

In some aspects, a base station for wireless communication may include a memory and one or more processors operatively coupled to the memory. The memory and the one or more processors may be configured to determine a first SFI for a first UE and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and transmit an indication of the first SFI for the first UE and an indication of the second SFI for the second UE.

In some aspects, a non-transitory computer-readable medium may store one or more instructions for wireless communication. The one or more instructions, when executed by one or more processors of a base station, may cause the one or more processors to determine a first SFI for a first UE and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and transmit an indication of the first SFI for the first UE and an indication of the second SFI for the second UE.

In some aspects, an apparatus for wireless communication may include means for determining a first SFI for a first UE and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and means for transmitting an indication of the first SFI for the first UE and an indication of the second SFI for the second UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
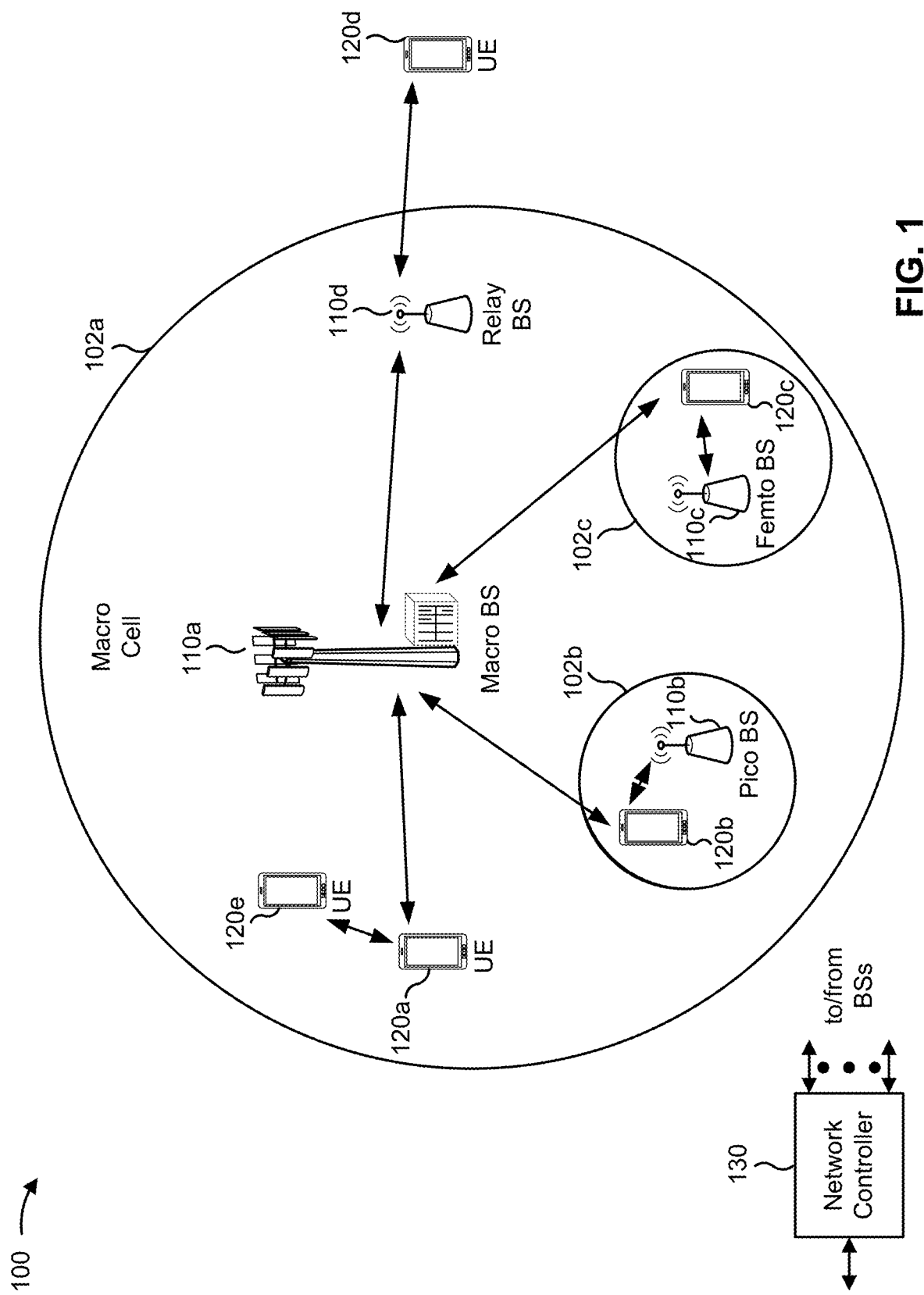
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
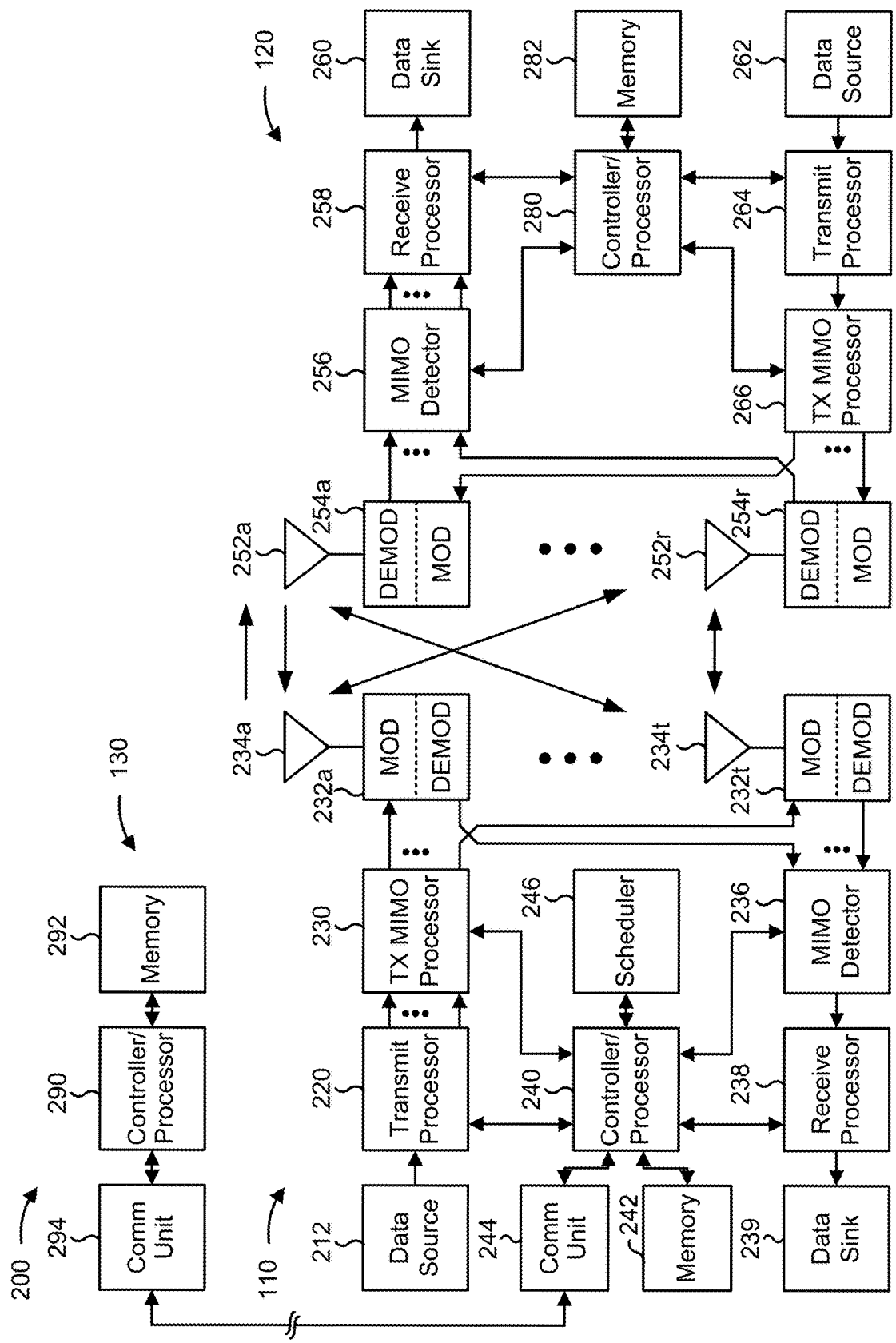
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4 and 5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4 and 5).

Controller/processor 240 of base station 110, controller/processor 280 of UE 120, and/or any other component(s) of FIG. 2 may perform one or more techniques associated with determining beam and panel specific slot format indication configurations to reduce cross-link interference, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, the base station includes means for determining a first SFI for a first UE and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; or means for transmitting an indication of the first SFI for the first UE and an indication of the second SFI for the second UE. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining the first SFI for the first UE and the second SFI for the second UE to avoid an uplink-downlink symbol mismatch for communications with the first UE and communications with the second UE.

In some aspects, the base station includes means for transmitting, to at least one of the first UE or the second UE, an indication of one or more of: one or more antenna modules to avoid using when the base station indicates to use an SFI of a set of SFIs, or one or more antenna modules to use when the base station indicates to use an SFI of a set of SFIs.

In some aspects, the base station includes means for transmitting an indication of a first antenna module or panel for the first UE to use for the first SFI and an indication of a second antenna module or panel for the second UE to use for the second SFI.

In some aspects, the base station includes means for coordinating SFIs for the first UE, the second UE, and additional UEs to reduce cross-link interference from uplink-downlink symbol mismatches.

In some aspects, the base station includes means for determining a number of symbols for beam training with the first UE and the second UE, wherein the first UE is in uplink for a portion of the beam training and the second UE is in downlink for the portion of the beam training.

In some aspects, the base station includes means for receiving a first beam training report from the first UE and a second beam training report from the second UE; or means for determining potential cross-link interference based at least in part on the first beam training report and the second beam training report.

In some aspects, the base station includes means for receiving the first report from an additional base station, or means for receiving the second report from an additional base station.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
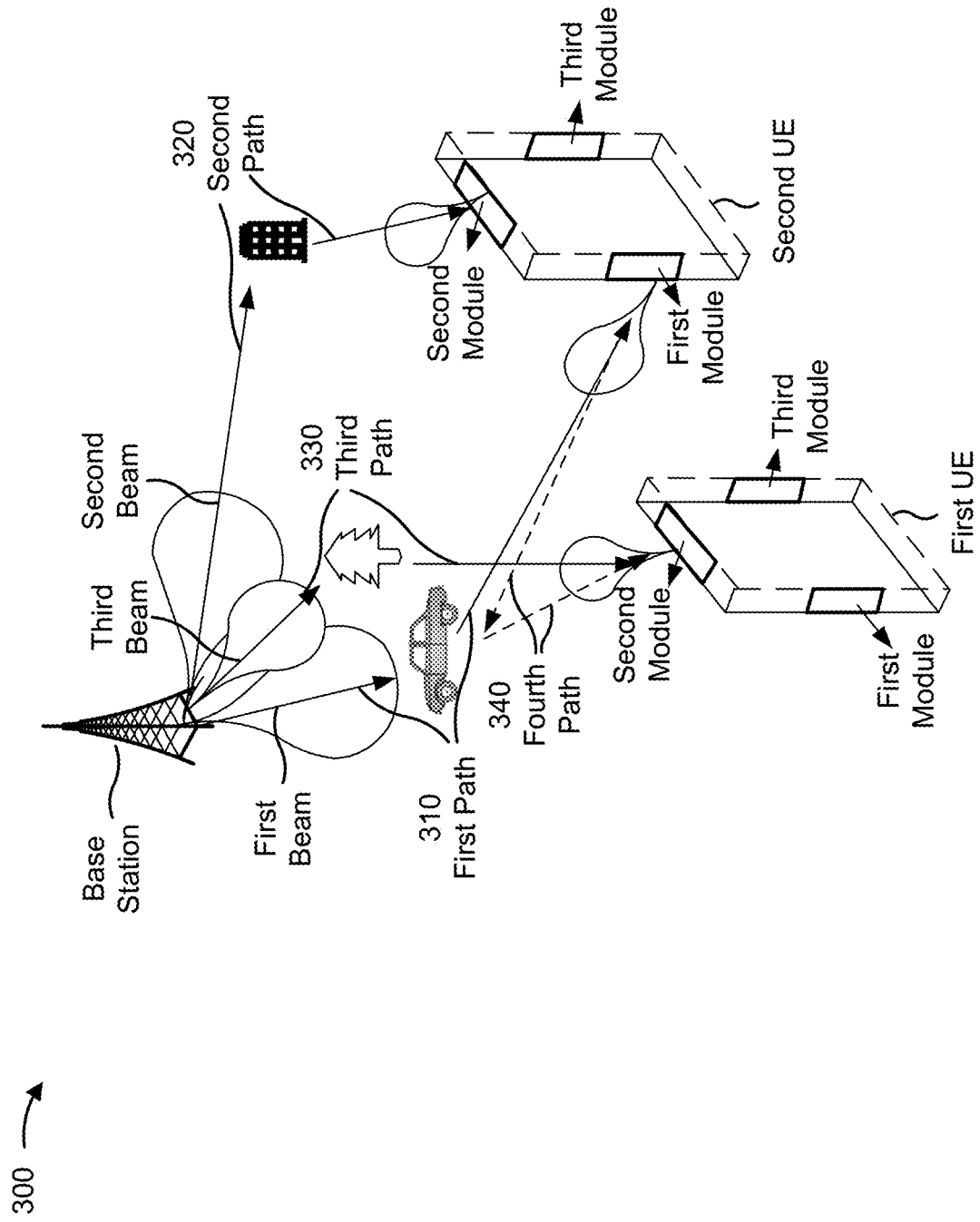
FIG. 3 is a diagram illustrating an example of cross-link interference, in accordance with the present disclosure.

FIG. 3 is a diagram illustrating an example 300 of cross-link interference, in accordance with the present disclosure. As shown in FIG. 3, a first UE and a second UE communicate with a base station via one or more communication paths.

The first UE and/or the second UE may perform beam training to identify beams and/or modules (e.g., antenna modules) for communicating with the base station. For example, the first UE may determine that a first module may be inferior for communicating with the base station (in terms of data rates, diversity, robustness, and/or), a second module may be used (e.g., superior) for communicating with the base station, and a third module may also be inferior for communicating with the base station. The second UE may determine that a first module may be used for communicating with the base station, a second module may be used for communicating with the base station, and a third module may be inferior for communicating with the base station.

The base station may determine that the base station may use a first beam and/or a second beam to communicate with the second UE. The base station may determine that the base station may use a third beam to communicate with the first UE.

As shown by reference number 310, the base station may use a first beam to communicate with the second UE via a first communication path. When the base station transmits to the second UE along the first communication path, the transmissions may reflect or diffract based at least in part on one or more objects along the first communication path. When the second UE transmits to the base station along the first communication path, the second UE may use the first module to transmit via a beam that is generally reciprocal to the first beam.

As shown by reference number 320, the base station may use a second beam to communicate with the second UE via a second communication path. When the base station transmits to the second UE along the second communication path, the transmissions may reflect or diffract based at least in part on one or more objects along the second communication path. When the second UE transmits to the base station along the second communication path, the second UE may use the second module to transmit via a beam that is generally reciprocal to the second beam.

As shown by reference number 330, the base station may use a third beam to communicate with the first UE via a third communication path. When the base station transmits to the first UE along the third communication path, the transmissions may reflect or diffract based at least in part on one or more objects along the third communication path. When the first UE transmits to the base station along the third communication path, the first UE may use the second module to transmit via a beam that is generally reciprocal to the third beam.

As shown by reference number 340, clutter in the environment may reflect or diffract energy from an uplink transmission from the second UE using the first module toward the first UE along a fourth path. The clutter may cause cross-link interference for the first UE if the first UE attempts to receive a downlink transmission using the second module while the second UE transmits an uplink transmission via the first module.

Additionally, or alternatively, when the first UE transmits an uplink transmission via the second module, clutter may reflect or diffract energy toward the second UE along the fourth path. The clutter may cause cross-link interference for the second UE if the first UE transmits an uplink transmission using the second module while the first UE attempts to receive a downlink transmission via the first module.

Based at least in part on the clutter leading to cross-link interference, the first UE and/or the second UE may be unable to receive (e.g., demodulate, decode, and/or the like) a downlink transmission. The first UE and/or the second UE may fail to receive the downlink transmission based at least in part on interference from an uplink-downlink mismatch (e.g., for one or more symbols in an SFI) in which the first UE and/or the second UE attempt to receive a downlink transmission while another UE (e.g., the first UE, the second UE, and/or an additional UE) transmits an uplink transmission. The UE and/or the base station may use computing, communication, and/or network resources to recover from the failed downlink transmission, to determine that the failure is based at least in part on an uplink-downlink mismatch, and/or the like.

As indicated above, FIG. 3 is provided as an example. Other examples may differ from what is described with respect to FIG. 3.

In some aspects described herein, a base station (e.g., base station 110) may receive, from multiple UEs (e.g., UEs 120), indications of channel qualities associated with one or more beams. The indications may include indications of antenna modules or panels used by the multiple UEs to determine the channel qualities associated with the one or more beams. The base station may use the indications to determine channel quality information that is specific to antenna modules or panels of the multiple UEs. In some aspects, the base station may perform beam training with the multiple UEs with some of the multiple UEs in uplink and some of the multiple UEs in downlink, so that the UEs in downlink can measure cross-link interference and report the cross-link interference to the base station.

The base station may use the channel quality information, the reports on cross-link information, and/or location information associated with the multiple UEs to determine which UEs of the multiple UEs can operate with an uplink-downlink symbol mismatch without significant cross-link interference. Based at least in part on the base station determining which UEs can operate with an uplink-downlink symbol mismatch without significant cross-link interference, the base station may avoid configuring SFIs for the multiple UEs that would cause significant cross-link interference (e.g., an amount of cross-link interference that satisfies a threshold), may decrease a likelihood of failed downlink transmissions, and/or the like. In this way, the base station and one or more UEs may conserve computing, communication, and/or network resources that may otherwise be used to recover from failed downlink transmissions, to determine that the failure is based at least in part on an uplink-downlink mismatch, to replace an existing SFI for one or more UEs, and/or the like.

Figure 4:
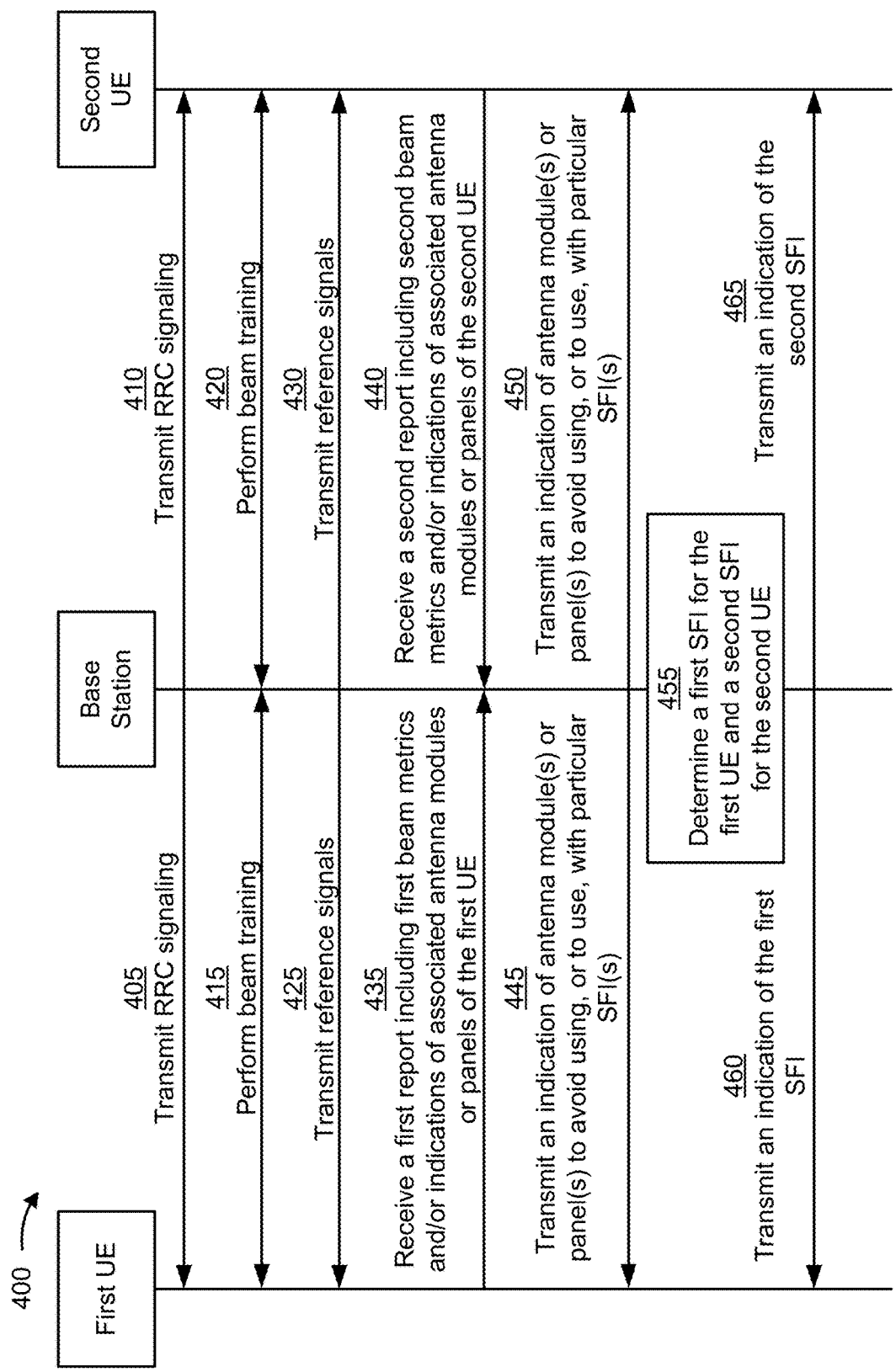
FIG. 4 is a diagram illustrating an example of determining beam and panel specific slot format indication configurations to reduce cross-link interference, in accordance with the present disclosure.

FIG. 4 is a diagram illustrating an example 400 of determining beam and panel specific slot format indication configurations to reduce cross-link interference, in accordance with the present disclosure. As shown, a base station (e.g., base station 110) communicates with a first UE (e.g., UE 120) and a second UE (e.g., UE 120) using one or more of downlink transmissions and uplink transmissions. In some aspects, the base station, the first UE, and/or the second UE may be part of one or more wireless networks (e.g., the wireless network 100). In some aspects, the first UE and the second UE may be configured with multiple antenna modules through which the first UE and/or the second UE may communicate with the base station and/or an additional base station.

In some aspects the first UE may communicate via a first link with the base station and the second UE may communicate via a second link with an additional base station. In some aspects, the first UE and/or the second UE may transmit and/or receive multiple streams of data (e.g., using dual connectivity, carrier aggregation, and/or the like) with one or more base stations, remote radio heads, transmission and reception points, and/or the like. The first UE and the second UE may be in cell coverage of each other and may potentially create cross-link interference for each other. In some aspects, the base station may receive information associated with the first UE and/or the second UE from one or more additional base stations that provide communication links with the first UE and/or the second UE.

As shown in FIG. 4, and by reference numbers 405 and 410, the base station may transmit radio resource control (RRC) signaling and/or other signaling to the first UE and/or the second UE with information to configure the first UE and/or the second UE. In some aspects, the RRC signaling and/or other signaling may indicate that the first UE and/or the second UE is to be configured to perform beam training for a set of beams. The beam training may include measuring one or more reference signals (e.g., channel state information reference signals (CSI-RSs)) using one or more antenna modules or panels. The beam training may include the first UE and/or the second UE reporting beam-specific and/or antenna module or panel specific channel quality information to the base station. In some aspects, the RRC signaling may indicate that the first UE and/or the second UE are to be configured to report one or more preferred beams along with corresponding indications of one or more antenna modules or panels that the first UE and/or the second UE may use to communicate using the one or more preferred beams.

As shown by reference numbers 415 and 420, the base station may perform beam training with the first UE and/or the second UE. In some aspects, the base station may perform the beam training for multiple UEs (e.g., including the first UE, the second UE, and/or additional UEs) with some of the multiple UEs in uplink and some of the multiple UEs in downlink so that the UEs in downlink can measure cross-link interference and report the cross-link interference to the base station.

In some aspects, the base station may determine a number of symbols for beam training. In some aspects, the base station may determine the number of symbols based at least in part on a number of connected UEs, locations of the connected UEs, and/or the like. For example, if a large number of UEs are connected, the base station may use a relatively large number of symbols for beam training, to allow for measurements with various combinations of uplink-downlink symbol mismatching. The base station may receive beam training reports from the multiple UEs to determine potential cross-link interference and/or to determine which of the multiple UEs may operate with uplink-downlink symbol mismatches without significant cross-link interference.

As shown by reference numbers 425 and 430, the base station may transmit reference signals (e.g., CSI-RSs) to the first UE and/or the second UE. For example, the base station may transmit the reference signals using one or more beams (e.g., selected based at least in part on beam training, sounding reference signals, and/or the like).

As shown by reference number 435, the base station may receive a first report including first beam metrics and/or indications of associated antenna modules or panels of the first UE. The first report may be associated with a beam training process, or may be independent from a beam training process. In some aspects, the first report may indicate one or more beams and/or one or more antenna modules or panels of the first UE that the first UE may use to communicate with the base station.

As shown by reference number 440, the base station may receive a second report including second beam metrics and/or indications of associated antenna modules or panels of the second UE. The second report may be associated with a beam training process, or may be independent from a beam training process. In some aspects, the second report may indicate one or more beams and/or one or more antenna modules or panels of the second UE that the second UE may use to communicate with the base station.

As shown by reference numbers 445 and 450, the base station may transmit one or more indications to the first UE and/or the second UE of one or more antenna modules to avoid using with one or more SFIs. In some aspects, the one or more indications may indicate one or more antenna modules to use with one or more other SFIs. For example, the one or more indications may include a mapping of SFIs to antenna modules to use, or to not use, for communications using the SFIs.

As shown by reference number 455, the base station may determine a first SFI for the first UE and/or a second SFI for the second UE. In some aspects, the base station may determine the first SFI and/or the second SFI based at least in part on the first report and/or the second report. In some aspects, the base station may determine the first SFI and/or the second SFI based at least in part on the beam training and/or beam training reports. In some aspects, the base station may determine the first SFI and/or the second SFI based at least in part on locations of the first UE and the second UE.

In some aspects, the first SFI and the second SFI may be based at least in part on a determination of a potential cross-link interference between uplink transmissions and downlink transmissions. In some aspects, the base station may determine the first SFI and the second SFI such that the first SFI and/or the second SFI avoid an uplink-downlink symbol mismatch for communications with the first UE and communications with the second UE.

In some aspects, the base station may determine the first SFI and the second SFI based at least in part on frequencies and/or frequency bands associated with communications with the first UE and communications with the second UE. For example, if the frequencies and/or frequency bands are similar (e.g., wherein a frequency or frequency band is within 20% of the higher frequency or frequency band, within 50% of the higher frequency or frequency band, and/or the like), the base station may determine to avoid uplink-downlink symbol mismatches. In some aspects, the first SFI and/or the second SFI may be based at least in part on a set of frequency bands used for contiguous or non-contiguous intra-band or inter-band carrier aggregation or full duplex communications by the first UE and/or the second UE.

In some aspects, the base station may coordinate SFIs for the first UE, the second UE, and additional UEs to reduce cross-link interference from uplink-downlink symbol mismatches. For example, the base station may use information associated with the first UE, the second UE, and the additional UEs to determine groups (e.g., location-based groups) that are to be uplink-downlink symbol matched. Additionally, or alternatively, the base station may use information associated with the first UE, the second UE, and the additional UEs to determine which groups can operate with uplink-downlink symbol mismatches without significant cross-link interference. In some aspects, the first UE and the second UE may cooperate and attempt to receive data from a particular base station (e.g., the base station), remote radio head, or transmission and reception point. The first SFI and the second SFI may be based at least in part on potential cross-link interference, from transmissions from one or more additional UEs, for the cooperation.

As shown by reference numbers 460 and 465, the base station may transmit an indication of the first SFI to the first UE and/or an identification of the second SFI to the second UE. In some aspects, the base station may transmit one or more of the indications via an additional base station, remote radio head, transmission and reception point, and/or the like. In some aspects, the base station and one or more additional base station, remote radio head, transmission and reception point, and/or the like may coordinate SFIs for the first UE, the second UE, and/or additional UEs to reduce cross-link interference that is based at least in part on uplink-downlink symbol mismatches.

In some aspects, the base station may transmit (e.g., along with the one or more indications of SFIs, independently from the one or more indications, and/or the like) an indication of a first antenna module or panel for the first UE to use for the first SFI and/or an indication of a second antenna module or panel for the second UE to use for the second SFI.

Based at least in part on the base station determining which UEs can operate with an uplink-downlink symbol mismatch without significant cross-link interference, the base station may avoid configuring SFIs for UEs that would cause significant cross-link interference, may decrease a likelihood of failed downlink transmissions, and/or the like. In this way the base station, the first UE, and/or the second UE may conserve computing, communication, and/or network resources that may otherwise be used to recover from failed downlink transmissions, to determine that the failure is based at least in part on an uplink-downlink mismatch, to replace an existing SFI for one or more UEs, and/or the like.

As indicated above, FIG. 4 is provided as an example. Other examples may differ from what is described with respect to FIG. 4.

FIG. 5 is a diagram illustrating an example process 500 performed, for example, by a base station, in accordance with the present disclosure. Example process 500 is an example where the base station (e.g., base station 110 and/or the like) performs operations associated with determining beam and panel specific slot format indication configurations to reduce cross-link interference.

As shown in FIG. 5, in some aspects, process 500 may include determining a first SFI for a first UE and a second SFI for a second UE based at least in part on a first report that includes first beam metrics for a first set of beams and indications of associated antenna modules or panels of the first UE, and a second report that includes beam metrics for a second set of beams and indications of associated antenna modules or panels of the second UE (block 510). For example, the base station (e.g., using transmit processor 220, receive processor 238, controller/processor 240, memory 242, and/or the like) may determine a first SFI for a first UE and a second SFI for a second UE based at least in part on a first report that includes first beam metrics for a first set of beams and indications of associated antenna modules or panels of the first UE, and a second report that includes beam metrics for a second set of beams and indications of associated antenna modules or panels of the second UE, as described above.

As further shown in FIG. 5, in some aspects, process 500 may include transmitting an indication of the first SFI for the first UE and an indication of the second SFI for the second UE (block 520). For example, the base station (e.g., using transmit processor 220, receive processor 238, controller/processor 240, memory 242, and/or the like) may transmit an indication of the first SFI for the first UE and an indication of the second SFI for the second UE, as described above.

Process 500 may include additional aspects, such as any single aspect or any combination of aspects described below and/or in connection with one or more other processes described elsewhere herein.

In a first aspect, determining the first SFI for the first UE and the second SFI for the second UE comprises: determining the first SFI for the first UE and the second SFI for the second UE to avoid an uplink-downlink symbol mismatch for communications with the first UE and communications with the second UE.

In a second aspect, alone or in combination with the first aspect, the first SFI and the second SFI are based at least in part on a determination of a potential cross-link interference between uplink transmissions and downlink transmissions.

In a third aspect, alone or in combination with one or more of the first and second aspects, process 500 includes transmitting, to at least one of the first UE or the second UE, an indication of one or more antenna modules to avoid using when the base station indicates to use an SFI of a set of SFIs.

In a fourth aspect, alone or in combination with one or more of the first through third aspects, process 500 includes transmitting, to at least one of the first UE or the second UE, an indication of one or more antenna modules to use when the base station indicates to use an SFI of a set of SFIs.

In a fifth aspect, alone or in combination with one or more of the first through fourth aspects, determining the first SFI for the first UE and the second SFI for the second UE is based at least in part on locations of the first UE and the second UE.

In a sixth aspect, alone or in combination with one or more of the first through fifth aspects, determining the first SFI for the first UE and the second SFI for the second UE is based at least in part on at least one of frequencies or frequency bands associated with communications with the first UE and communications with the second UE.

In a seventh aspect, alone or in combination with one or more of the first through sixth aspects, process 500 includes transmitting an indication of a first antenna module or panel for the first UE to use for the first SFI and an indication of a second antenna module or panel for the second UE to use for the second SFI.

In an eighth aspect, alone or in combination with one or more of the first through seventh aspects, at least one of: the first SFI is based at least in part on a first set of frequency bands used for contiguous or non-contiguous intra-band or inter-band carrier aggregation or full duplex communications by the first UE, or the second SFI is based at least in part on a second set of frequency bands used for contiguous or non-contiguous intra-band or inter-band carrier aggregation or full duplex communications by the second UE.

In a ninth aspect, alone or in combination with one or more of the first through eighth aspects, process 500 includes coordinating SFIs for the first UE, the second UE, and additional UEs to reduce cross-link interference from uplink-downlink symbol mismatches.

In a tenth aspect, alone or in combination with one or more of the first through ninth aspects, process 500 includes determining a number of symbols for beam training with the first UE and the second UE, wherein the first UE is in uplink for a portion of the beam training and the second UE is in downlink for the portion of the beam training.

In an eleventh aspect, alone or in combination with one or more of the first through tenth aspects, process 500 includes receiving the first report from an additional base station, or receiving the second report from the additional base station.

In a twelfth aspect, alone or in combination with one or more of the first through eleventh aspects, the first UE communicates via a first link with the base station, the second UE communicates via a second link with the additional base station, and the first UE is in cell coverage of the second UE.

In a thirteenth aspect, alone or in combination with one or more of the first through twelfth aspects, at least one of the first UE or the second UE communicates multiple streams of data with at least two base stations, remote radio heads, transmission and reception points, or a combination thereof.

In a fourteenth aspect, alone or in combination with one or more of the first through thirteenth aspects, the first UE and the second UE cooperate and attempt to receive data from a particular base station, remote radio head, or transmission and reception point, and the cooperation is poor based at least in part on cross-link interference from transmissions from a third UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a base station, comprising: determining a first slot format indication (SFI) for a first user equipment (UE) and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and transmitting an indication of the first SFI for the first UE and an indication of the second SFI for the second UE.

Aspect 2: The method of Aspect 1, wherein determining the first SFI for the first UE and the second SFI for the second UE comprises: determining the first SFI for the first UE and the second SFI for the second UE to avoid an uplink-downlink symbol mismatch for communications with the first UE and communications with the second UE.

Aspect 3: The method of any of Aspects 1-2, wherein the first SFI and the second SFI are based at least in part on a determination of a potential cross-link interference between uplink transmissions and downlink transmissions.

Aspect 4: The method of any of Aspects 1-3, further comprising transmitting, to at least one of the first UE or the second UE, an indication of one or more of: one or more antenna modules to avoid using when the base station indicates to use an SFI of a set of SFIs, or one or more antenna modules to use when the base station indicates to use an SFI of a set of SFIs.

Aspect 5: The method of any of Aspects 1-4, wherein determining the first SFI for the first UE and the second SFI for the second UE is based at least in part on locations of the first UE and the second UE.

Aspect 6: The method of any of Aspects 1-5, wherein determining the first SFI for the first UE and the second SFI for the second UE is based at least in part on at least one of frequencies or frequency bands associated with communications with the first UE and communications with the second UE.

Aspect 7: The method of any of Aspects 1-6, further comprising: transmitting an indication of a first antenna module or panel for the first UE to use for the first SFI and an indication of a second antenna module or panel for the second UE to use for the second SFI.

Aspect 8: The method of any of Aspects 1-7, wherein at least one of: the first SFI is based at least in part on a first set of frequency bands used for contiguous or non-contiguous intra-band or inter-band carrier aggregation or full duplex communications by the first UE, or the second SFI is based at least in part on a second set of frequency bands used for contiguous or non-contiguous intra-band or inter-band carrier aggregation or full duplex communications by the second UE.

Aspect 9: The method of any of Aspects 1-8, further comprising: coordinating SFIs for the first UE, the second UE, and additional UEs to reduce cross-link interference from uplink-downlink symbol mismatches.

Aspect 10: The method of any of Aspects 1-9, further comprising: determining a number of symbols for beam training with the first UE and the second UE, wherein the first UE is in uplink for a portion of the beam training and the second UE is in downlink for the portion of the beam training.

Aspect 11: The method of Aspect 10, further comprising: receiving a first beam training report from the first UE and a second beam training report from the second UE; and determining potential cross-link interference based at least in part on the first beam training report and the second beam training report.

Aspect 12: The method of any of Aspects 1-11, further comprising at least one of: receiving the first report from an additional base station, or receiving the second report from the additional base station.

Aspect 13: The method of Aspect 12, wherein the first UE communicates via a first link with the base station, wherein the second UE communicates via a second link with the additional base station, and wherein the first UE is in cell coverage of the second UE.

Aspect 14: The method of Aspect 1, wherein at least one of the first UE or the second UE communicates multiple streams of data with at least two base stations, remote radio heads, transmission and reception points, or a combination thereof.

Aspect 15: The method of Aspect 1, wherein the first UE and the second UE cooperate and attempt to receive data from a particular base station, remote radio head, or transmission and reception point, and wherein the first SFI and the second SFI are based at least in part on potential cross-link interference, from transmissions from a third UE, for the cooperation.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station for wireless communication, comprising:
one or more memories; and
one or more processors, coupled to the one or more memories, and configured to:
   determine a first slot format indication (SFI) for a first user equipment (UE) and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and
   transmit an indication of the first SFI for the first UE and an indication of the second SFI for the second UE,
   wherein the one or more processors, to determine the first SFI for the first UE and the second SFI for the second UE, are configured to:
      determine the first SFI for the first UE and the second SFI for the second UE to avoid an uplink-downlink symbol mismatch for communications with the first UE and communications with the second UE.

2. A base station for wireless communication, comprising:
one or more memories; and
one or more processors, coupled to the one or more memories, and configured to:
   determine a first slot format indication (SFI) for a first user equipment (UE) and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and
   transmit an indication of the first SFI for the first UE and an indication of the second SFI for the second UE,
   wherein at least one of:
      the first SFI is based at least in part on a first set of frequency bands used for contiguous or non-contiguous intra-band or inter-band carrier aggregation or full duplex communications by the first UE, or
      the second SFI is based at least in part on a second set of frequency bands used for contiguous or non-contiguous intra-band or inter-band carrier aggregation or full duplex communications by the second UE.

3. The base station of claim 2, wherein the first SFI is based at least in part on the first set of frequency bands used for contiguous or non-contiguous intra-band or inter-band carrier aggregation or full duplex communications by the first UE.

4. The base station of claim 2, wherein the second SFI is based at least in part on the second set of frequency bands used for contiguous or non-contiguous intra-band or inter-band carrier aggregation or full duplex communications by the second UE.

5. The base station of claim 2, wherein the first SFI is based at least in part on the first set of frequency bands used for contiguous or non-contiguous intra-band or inter-band carrier aggregation or full duplex communications by the first UE, and wherein the second SFI is based at least in part on the second set of frequency bands used for contiguous or non-contiguous intra-band or inter-band carrier aggregation or full duplex communications by the second UE.

6. A base station for wireless communication, comprising:
one or more memories; and
one or more processors, coupled to the one or more memories, configured to:
   determine a first slot format indication (SFI) for a first user equipment (UE) and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and
   transmit an indication of the first SFI for the first UE and an indication of the second SFI for the second UE,
   wherein the one or more processors are further configured to:
      determine a number of symbols for beam training with the first UE and the second UE,
      wherein the first UE is in uplink for a portion of the beam training and the second UE is in downlink for the portion of the beam training.

7. The base station of claim 6, wherein the one or more processors are further configured to:

receive a first beam training report from the first UE and a second beam training report from the second UE; and
determine potential cross-link interference based at least in part on the first beam training report and the second beam training report.

8. A base station for wireless communication, comprising:
one or more memories; and
one or more processors, operatively coupled to the one or more memories, configured to:
  determine a first slot format indication (SFI) for a first user equipment (UE) and a second SFI for a second UE based at least in part on a first report that includes first beam metrics for a first set of beams and indications of associated antenna modules or panels of the first UE and a second report that includes beam metrics for a second set of beams and indications of associated antenna modules or panels of the second UE; and
  transmit an indication of the first SFI for the first UE and an indication of the second SFI for the second UE,
  wherein:
    the one or more processors are further configured to receive the first report from an additional base station or receive the second report from the additional base station, the first UE communicates via a first link with the base station, the second UE communicates via a second link with the additional base station, and the first UE is in cell coverage of the second UE; or
    the first UE and the second UE cooperate and attempt to receive data from a particular base station, remote radio head, or transmission and reception point, and the first SFI and the second SFI are based at least in part on potential cross-link interference, from transmissions from a third UE, for the cooperation.

9. The base station of claim 8, wherein the one or more processors are further configured to receive the first report from the additional base station or receive the second report from the additional base station, the first UE communicates via the first link with the base station, the second UE communicates via the second link with the additional base station, and the first UE is in cell coverage of the second UE.

10. The base station of claim 9, wherein the one or more processors are configured to receive the first report from the additional base station.

11. The base station of claim 9, wherein the one or more processors are configured to receive the second report from the additional base station.

12. The base station of claim 9, wherein the one or more processors are configured to receive the first report from the additional base station and receive the second report from the additional base station.

13. The base station of claim 8, wherein the first UE and the second UE cooperate and attempt to receive data from the particular base station, remote radio head, or transmission and reception point, and wherein the first SFI and the second SFI are based at least in part on the potential cross-link interference, from transmissions from the third UE, for the cooperation.

* * * * *